(12) United States Patent
Peglowski et al.

(10) Patent No.: US 10,006,502 B2
(45) Date of Patent: Jun. 26, 2018

(54) POSITION FORCE CONTROLLED ACTUATOR

(71) Applicant: BorgWarner Inc., Auburn Hills, MI (US)

(72) Inventors: Brett Peglowski, Oakland, MI (US); Chris Blair, Fenton, MI (US); Calahan Campton, Royal Oak, MI (US)

(73) Assignee: BorgWarner Inc., Auburn Hills, MI (US)

( * ) Notice: Subject to any disclaimer, the term of this patent is extended or adjusted under 35 U.S.C. 154(b) by 0 days. days.

(21) Appl. No.: 15/441,949

(22) Filed: Feb. 24, 2017

(65) Prior Publication Data

US 2017/0254371 A1    Sep. 7, 2017

Related U.S. Application Data

(60) Provisional application No. 62/302,110, filed on Mar. 1, 2016.

(51) Int. Cl.
*F16D 23/12* (2006.01)
*F16D 41/12* (2006.01)

(52) U.S. Cl.
CPC .............. *F16D 23/12* (2013.01); *F16D 41/12* (2013.01); *F16D 2023/123* (2013.01)

(58) Field of Classification Search
CPC ...... F16H 61/0204; F16H 59/18; F16H 3/663; F16H 2200/006; F16H 2200/201; F16H 2200/2046; F16H 2200/2066; F16H 2200/2082; F16H 2306/14
See application file for complete search history.

(56) References Cited

U.S. PATENT DOCUMENTS

| | | | | |
|---|---|---|---|---|
| 3,151,459 A * | 10/1964 | Brukner | ................ | B60T 11/103 188/152 |
| 3,212,357 A * | 10/1965 | Knowles | ................ | F16H 41/26 192/221 |
| 4,246,992 A * | 1/1981 | Hakes | ................... | B60T 11/103 180/6.7 |
| 5,127,506 A * | 7/1992 | Muller | ................... | B60K 23/02 192/85.56 |
| 5,452,779 A * | 9/1995 | Gee | ......................... | B60T 11/20 192/12 C |
| 8,079,453 B2 | 12/2011 | Kimes | | |
| 2004/0057840 A1* | 3/2004 | Hirota | ................. | F04B 27/1804 417/222.2 |
| 2015/0060222 A1* | 3/2015 | Showalter | ............... | F16D 41/16 192/43.1 |
| 2015/0354640 A1 | 12/2015 | Papania | | |

* cited by examiner

*Primary Examiner* — Jacob S. Scott
*Assistant Examiner* — Tinh Dang
(74) *Attorney, Agent, or Firm* — Miller, Matthias & Hull LLP

(57) ABSTRACT

An actuator device for a selectable clutch having three or more clutch modes may include a dual rate piston with a stable middle position. A positive stop provides very accurate control when shifting from an end position to a middle position without overshoot. Precision position control of the actuator device facilitates consistent, stable control of the current mode of the selectable clutch.

20 Claims, 6 Drawing Sheets

POSITION FORCE CONTROLLED ACTUATOR

CROSS-REFERENCE TO RELATED APPLICATION

This patent application claims priority under 35 USC § 119(e) to U.S. Provisional Patent Application Ser. No. 62/302,110 filed on Mar. 1, 2016.

TECHNICAL FIELD

This disclosure relates generally to clutches, and in particular to clutches having multiple modes of engagement with a rotating element for selectively locking the element against rotation and allowing the element to rotate freely in one or both directions.

BACKGROUND

An automotive vehicle typically includes an internal combustion engine containing a rotary crankshaft configured to transfer motive power from the engine through a driveshaft to turn the wheels. A transmission is interposed between engine and driveshaft components to selectively control torque and speed ratios between the crankshaft and driveshaft. In a manually operated transmission, a corresponding manually operated clutch may be interposed between the engine and transmission to selectively engage and disengage the crankshaft from the driveshaft to facilitate manual shifting among available transmission gear ratios.

On the other hand, if the transmission is automatic, the transmission will normally include an internal plurality of automatically actuated clutch units adapted to dynamically shift among variously available gear ratios without requiring driver intervention. Pluralities of such clutch units, also called clutch modules, are incorporated within such transmissions to facilitate the automatic gear ratio changes.

In an automatic transmission for an automobile, anywhere from three to ten forward gear ratios may be available, not including a reverse gear. The various gears may be structurally comprised of inner gears, intermediate gears such as planet or pinion gears supported by carriers, and outer ring gears. Specific transmission clutches may be associated with specific sets of the selectable gears within the transmission to facilitate the desired ratio changes.

Because automatic transmissions include pluralities of gear sets to accommodate multiple gear ratios, the reliability of actuators used for automatically switching clutch modules between and/or among various available operating modes is a consistent design concern. It is also desirable to provide smooth transitions between the operating modes when the clutch modules engage and disengage from the gears. These considerations are also important in other operating environments where selectable clutch modules may be implemented to selectively allow and restrict the rotation of rotating components such as gears, shafts, torque converter components and the like. Therefore, much effort has been directed to finding ways to assure actuator reliability and seamless performance at competitive costs.

SUMMARY OF THE DISCLOSURE

In one aspect of the present disclosure, an actuator device for a selectable clutch having a plurality of mode positions for controlling relative rotation between two components connected by the selectable clutch is disclosed. The actuator device may include a piston housing having an exterior surface, a piston housing longitudinal bore extending longitudinally there through, a first fluid passage extending inwardly from the exterior surface and intersecting the piston housing longitudinal bore proximate a first bore end, and a second fluid passage extending inwardly from the exterior surface and intersecting the piston housing longitudinal bore proximate a second bore end. The actuator device may further include a main piston disposed within the piston housing longitudinal bore for longitudinal motion therein. The main piston may have a main piston main portion having a main piston main portion outer diameter and being disposed between the first fluid passage and the second fluid passage, and a main piston secondary portion having a main piston secondary portion outer diameter that is less than the main piston main portion outer diameter and extending longitudinally from the main piston main portion toward the second fluid passage. The actuator device may also include a secondary piston having a secondary piston longitudinal bore such that the secondary piston is disposed and slidable on the main piston secondary portion. The secondary piston may include a secondary piston main portion having a secondary piston main portion outer diameter that is less than the main piston main portion outer diameter, and a secondary piston secondary portion having a secondary piston secondary portion outer diameter that is less than the secondary piston main portion outer diameter and being disposed between the main piston main portion and the secondary piston main portion. The actuator device may still further include a stop snap ring having an annular shape and a stop snap ring inner diameter that is less than the secondary piston main portion outer diameter and greater than the secondary piston secondary portion outer diameter, wherein the stop snap ring is fixed within the piston housing longitudinal bore between the main piston main portion and the secondary piston main portion and with the secondary piston secondary portion extending there through. A first pressure force acting on the main piston toward the second bore end may be equal to a first pressure supplied at the first fluid passage multiplied by a first area equal to a main piston cross-sectional area of the main piston main portion. A second pressure force acting on the main piston toward the first bore end when the secondary piston main portion is not engaged by the stop snap ring may be equal to a second pressure supplied at the second fluid passage multiplied by a second area equal to a combined cross-sectional area of a main piston secondary portion cross-sectional area and a secondary piston main portion cross-sectional area. A third pressure force acting on the main piston toward the first bore end when the secondary piston main portion is engaged by the stop snap ring may be equal to the second pressure supplied at the second fluid passage multiplied by a third area equal to the main piston secondary portion cross-sectional area.

In another aspect of the present disclosure, a selectable clutch is disclosed. The selectable clutch may include an outer race, an inner race rotatable relative to the outer race, a selective locking mechanism having a plurality of locking modes for controlling relative rotation between two components connected by the selectable clutch, an actuator cam that is rotatable between a plurality of mode positions each causing the selective locking mechanism to engage one of the plurality of locking modes, and an actuator device such as that described in the preceding paragraph operatively connected to the actuator cam to move the selective locking mechanism between the plurality of mode positions as the main piston moves longitudinally within the piston housing longitudinal bore.

In a further aspect of the present disclosure, an actuator device for a selectable clutch having a plurality of mode positions for controlling relative rotation between two components connected by the selectable clutch is disclosed. The actuator device may include a piston housing having an exterior surface, a piston housing longitudinal bore extending longitudinally there through, a first fluid passage extending inwardly from the exterior surface and intersecting the piston housing longitudinal bore proximate a first bore end, and a second fluid passage extending inwardly from the exterior surface and intersecting the piston housing longitudinal bore proximate a second bore end, and a main piston disposed within the piston housing longitudinal bore for longitudinal motion therein. The main piston may include a main piston main portion having a main piston main portion outer diameter and being disposed between the first fluid passage and the second fluid passage, and a main piston secondary portion having a main piston secondary portion outer diameter that is less than the main piston main portion outer diameter and extending longitudinally from the main piston main portion toward the second fluid passage. The actuator device may further include a secondary piston having a secondary piston outer diameter and a secondary piston longitudinal bore such that the secondary piston is disposed and slidable on the main piston secondary portion within the piston housing longitudinal bore, and a stop snap ring fixed within the piston housing longitudinal bore between the main piston main portion and the second bore end and having an annular shape and a stop snap ring inner diameter that allow at least a portion of the secondary piston to pass through the stop snap ring. A first pressure force acting on the main piston toward the second bore end is equal to a first pressure supplied at the first fluid passage multiplied by a first area equal to a main piston cross-sectional area of the main piston main portion, a second pressure force acting on the main piston toward the first bore end when the secondary piston is not engaged by the stop snap ring is equal to a second pressure supplied at the second fluid passage multiplied by a second area equal to a combined cross-sectional area of a main piston secondary portion cross-sectional area and a secondary piston main portion cross-sectional area, and the second pressure force acting on the main piston when the secondary piston is engaged by the stop snap ring is equal to the second pressure supplied at the second fluid passage multiplied by a third area equal to the main piston secondary portion cross-sectional area.

Additional aspects are defined by the claims of this patent.

DETAILED DESCRIPTION

Figure 1:
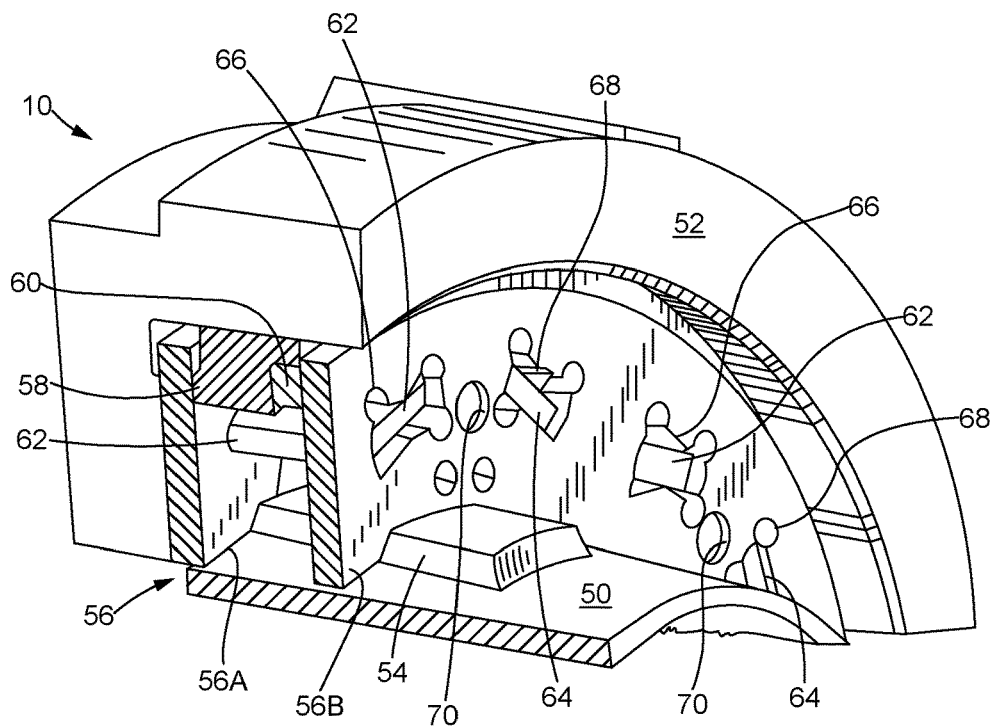
FIG. 1 is both a perspective and a cross-sectional view of a portion of one possible embodiment of a selectable in the form of a multimode clutch module that may be implemented in vehicles.

In accordance with the present disclosure, a selectable clutch, such as a multimode clutch module, may be implemented at various locations of a vehicle (not shown) to provide multiple modes for connecting and disconnecting rotatable components to prevent or allow, respectively, relative rotation between two components. Referring to FIG. 1, a multimode clutch 10 of a vehicle may be of the type illustrated and described in Intl. Publ. No. WO 2014/120595 A1, published on Aug. 7, 2014, by Papania, entitled "Multi-Mode Clutch Module," which is expressly incorporated by reference herein. While the multimode clutch 10 is illustrated and described herein, those skilled in art will understand that actuator devices in accordance with the present disclosure may be implemented with other types of selectable clutches providing multiple modes for connecting and disconnecting rotatable components to prevent or allow, respectively, relative rotation between two components, and the use of the actuator device with such selectable clutches is contemplated by the inventors. In the illustrated embodiment, the multimode clutch 10 may incorporate an interior driven hub 50 and an outer housing 52 that may be locked for rotation together in some modes of the multimode clutch 10 and may be unlocked for independent rotation with respect to each other in other modes of the multimode clutch 10 as will be described more fully below. The driven hub 50 may contain an array of circumferentially spaced cogs 54 adapted to secure an inner race 56 to the driven hub 50 for rotation therewith. As disclosed, the inner race 56 is comprised of first and second spaced plates 56A and 56B. An outer race 58 sandwiched between the pair of inner race plates 56A, 56B, is situated so as to allow for relative rotation between inner race 56 and the outer race 58, and with the outer race 58 being operatively coupled to the outer housing 52 for rotation therewith.

In the present design of the multimode clutch 10, an actuator cam 60 is interposed between one of the race plates 56A, 56B and the outer race 58 for rotation over a predetermined angle about a common axis of the driven hub 50 and the outer housing 52 to control movements of pairs of opposed pawls 62, 64 as will be described further hereinafter. The sets of pawls 62, 64 are trapped, and hence retained, between the inner race plates 56A, 56B to allow limited angular movements of the pawls 62, 64 held within bowtie shaped apertures 66, 68, respectively, subject to the control of the actuator cam 60. In each set, the combined pawl 62 and corresponding aperture 66 is similar to but oppositely oriented to the combined pawl 64 and corresponding aperture 68. The elements of the multimode clutch 10 are contained within the outer housing 52. A plurality of spaced apertures 70 are adapted to accommodate rivets (not shown) for providing fixed and rigid securement of each of the two inner race plates 56A and 56B relative to the other.

Figure 2:
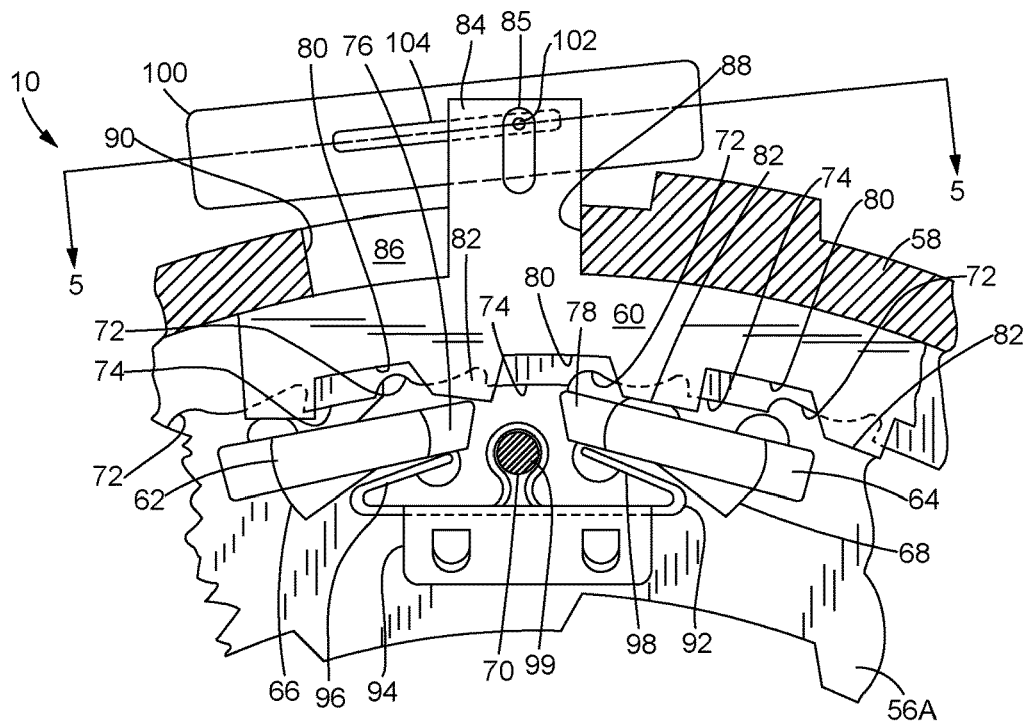
FIG. 2 is an enlarged side view of a portion of one possible embodiment of the multimode clutch module of FIG. 1 with the near inner race plate removed to reveal the internal components, and with an actuator cam in a one-way locked, one-way unlocked position.
Figure 3:
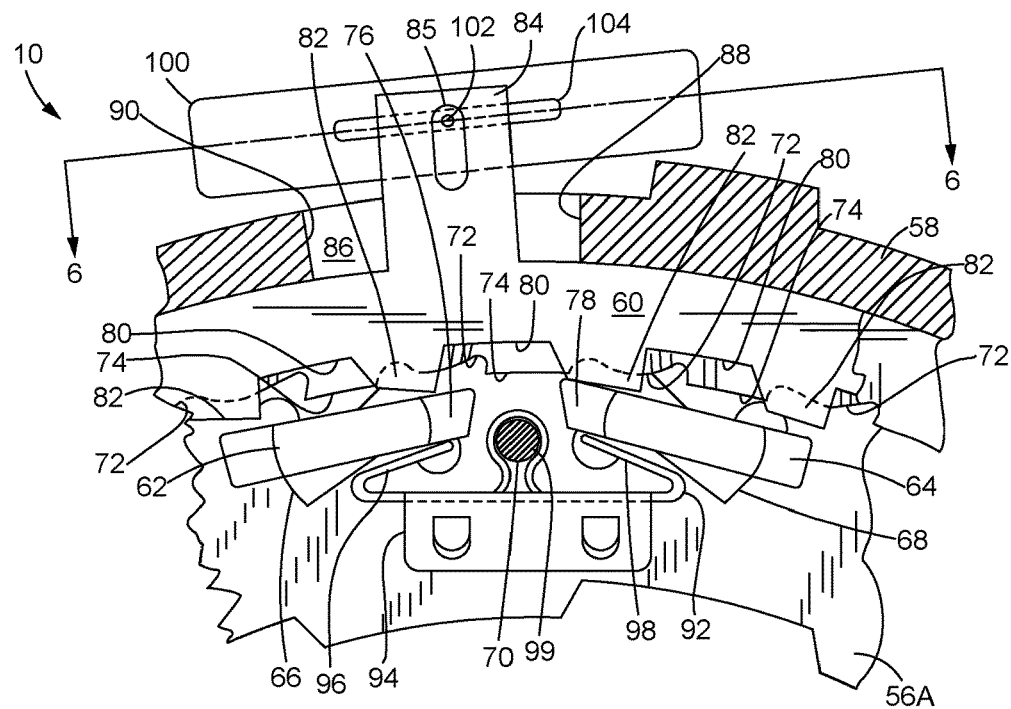
FIG. 3 is the enlarge view of one possible embodiment of the multimode clutch module of FIG. 1 with the actuator cam in a two-way unlocked position.
Figure 4:
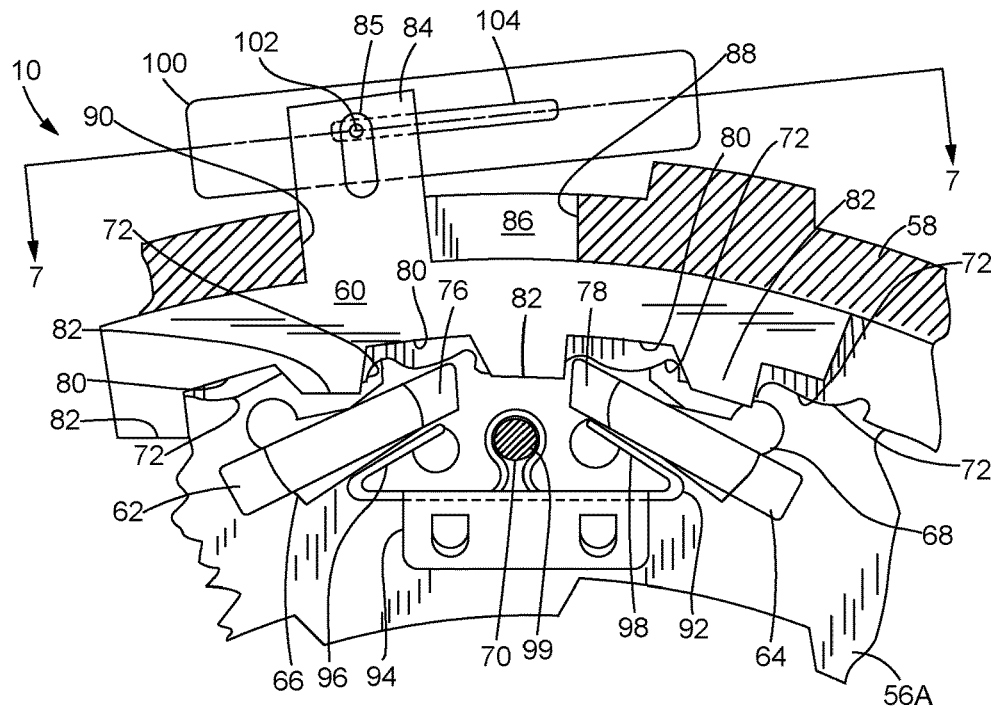
FIG. 4 is the enlarge view of the multimode clutch module of FIG. 1 with the actuator cam in a two-way locked position.

The operational components of the multimode clutch 10 are illustrated in FIGS. 2-4 that illustrate the various operational modes of the multimode clutch 10 for controlling the relative rotation between the components attached to the driven hub 50 and the outer housing 52. Referring first to FIG. 2, the outer race 58 is configured to accommodate interactions with the pawls 62, 64 by providing the inner circumference of the outer race 58 with circumferentially spaced notches 72, each defined by and positioned between pairs of radially inwardly projecting cogs 74. The notches 72 and cogs 74 are configured so that, in the absence of the actuator cam 60, a toe end 76 of each pawl 62 enters one of the notches 72 and is engaged by the corresponding cog 74 when the driven hub 50 and the inner race 56 rotate in a clockwise direction as viewed in FIG. 2 relative to the outer housing 52 and the outer race 58 to cause the connected components to rotate together. Similarly, a toe end 78 of each pawl 64 enters one of the notches 72 and is engaged by the corresponding cog 74 when the driven hub 50 and the inner race 56 rotate in a counterclockwise direction relative to the outer housing 52 and the outer race 58 to cause the connected components to rotate together.

Within its interior periphery, the actuator cam 60 incorporates a strategically situated array of circumferentially spaced recesses, herein called slots 80, defined by and situated between projections, herein called cam teeth 82. The slots 80 and cam teeth 82 are adapted to interact with the pawls 62, 64 to control their movement within the apertures 66, 68, respectively, and disposition within the notches 72 and engagement by the cogs 74 as will be described. The actuator cam 60 may further include an actuator tab 84 or other appropriate member or surface that may be engaged by an actuator device 100 that is capable of causing the actuator cam 60 to move through its rotational range to the positions shown in FIGS. 2-4. The actuator device 100 may be any appropriate actuation mechanism capable of moving the actuator cam 60, such as a hydraulic actuator as illustrated and described below operatively coupled to the actuator cam 60 and capable of rotating the actuator cam 60 to multiple positions. The actuator tab 84 may include a radially extending slot 85 that receives a cam actuator bar 102 extending from a longitudinally extending slot 104 of the actuator device 100. The cam actuator bar 102 may transmit forces from the actuator device 100 to rotate the actuator cam 60 in the clockwise and counterclockwise directions. The interconnection between the actuator cam 60 and the actuator device 100 is illustrative, and alternative arrangements and linkages facilitating conversion of translational motion of the actuator device 100 into rotational motion of the actuator cam 60 to shift between a plurality of available clutch modes are contemplated and will be apparent to those skilled in the art. In the illustrated embodiment, the actuator tab 84 may be disposed within a slot 86 through the outer race and the rotation of the actuator cam 60 may be limited by a first limit surface 88 engaging the actuator tab 84 at the position shown in FIG. 2 and a second limit surface 90 engaging the actuator tab 84 at the position shown in FIG. 4.

The pawls 62, 64 are asymmetrically shaped, and reversely identical. Each of the opposed pawls 62, 64 is movably retained within its own bowtie-shaped pawl aperture 66, 68, respectively, of the inner race plates 56A and 56B. The toe end 76, 78 of each individual pawl 62, 64, respectively, is urged radially outwardly via a spring 92. Each spring 92 has a base 94, and a pair of spring arms 96 and 98. The spring arms 96 bear against the bottoms of the pawls 62, while the spring arms 98 bear against the bottoms of the pawls 64, each to urge respective toe ends 76, 78 into engagement with the cogs 74 of the outer race 58 when not obstructed by the cam teeth 82 of the actuator cam 60. It will be appreciated from FIG. 2 that axially extending rivets 99 are used to secure the inner race plates 56A, 56B together. The rivets 99 extend through the apertures 70 in each of the plates 56A, 56B to hold the two plates 56A, 56B rigidly together, and to thus assure against any relative rotation with respect to the plates 56A, 56B. In lieu of the rivets 99, other structural fasteners may be employed within the scope of this disclosure to secure the inner race plates 56A, 56B.

It will be appreciated that the actuator device 100 ultimately controls the actuator tab 84 which, in turn, moves the actuator cam 60 between multiple distinct angular positions. Thus, the positioning of the pawls 62, 64 as axially retained between the riveted inner race plates 56A, 56B is directly controlled by the actuator cam 60 against forces of springs 92. In FIG. 2, the actuator tab 84 is shown positioned by the actuator device 100 in a first, angularly rightward selectable position, representative of a first, one-way locked, one-way unlocked or open mode. In this position, the slots 80 and cam teeth 82 of the actuator cam 60 are positioned so that the toe ends 76 of the pawls 62 are blocked by cam teeth 82 from engagement with notches 72, and hence with the cogs 74 on the interior of the outer race 58. As such, the inner race 56 is enabled to freewheel relative to the outer race 58, and to thus provide for an overrunning condition when the inner race 56 and the driven hub 50 are rotating clockwise relative to the outer race 58 and the outer housing 52. Conversely, however, the position of the actuator cam 60 allows of the toe ends 78 of the pawls 64 to enter the slots 80 of the actuator cam 60 due to the biasing force of the spring arms 98, and to thereby directly engage the cogs 74 of the outer race 58 to lock the inner race 56 and the outer race 58 together whenever the inner race 56 and the driven hub 50 undergo a driving, or counterclockwise rotational movement, thereby causing the driven hub 50 and the outer housing 52 to rotate together.

FIG. 3 illustrates the actuator tab 84 placed by the actuator device 100 in a second, intermediate selectable position, representative of a two-way unlocked or open mode of the multimode clutch 10. In this position, the slots 80 and the cam teeth 82 of the actuator cam 60 are positioned to prevent the toe ends 76, 78 of both pawls 62, 64 from entering the slots 80 of the actuator cam 60, and to maintain disengagement from the cogs 74 of the outer race 58. With the pawls 62, 64 blocked from engagement with the cogs 74, the inner race 56 and the driven hub 50 are enabled to freewheel relative to the outer race 58 and the outer housing 52 during relative rotation in either the clockwise or the counterclockwise direction.

In FIG. 4, the actuator tab 84 is shown in a third, angularly leftward selectable position, representative of a two-way locked mode of the multimode clutch 10. In this configuration, the actuator cam 60 is positioned so that the toe ends 76, 78 of both pawls 62, 64 enter the slots 80 of the actuator cam 60 under the biasing forces of the spring arms 96, 98, respectively, and are engaged by the cogs 74 of the outer race 58 as described above to lock the inner race 56 and the driven hub 50 to the outer race 58 and the outer housing 52 for rotation therewith, irrespective of the rotational direction of the inner race 56 and the driven hub 50.

Even though one specific embodiment of the multimode clutch 10 is illustrated and described herein, those skilled in the art will understand that alternative configurations of multimode clutches and other selectable clutches are possible that provide operational modes or positions as alternatives or in addition to two-way unlocked and two-way locked modes (FIGS. 3 and 4), and the one-way locked, one-way unlocked mode (FIG. 2). For example, an additional one-way locked, one-way unlocked mode that may provide for an overrunning condition when the inner race 56 and the driven hub 50 are rotating counter clockwise relative to the outer race 58 and the outer housing 52, and to lock the inner race 56 and the outer race 58 together whenever the inner race 56 and the driven hub 50 undergo a clockwise rotational movement so the driven hub 50 and the outer housing 52 rotate together. Moreover, alternate structures providing some or all of the modes discuss herein for selectable clutches may be implemented in a similar manner in vehicles, such as that illustrated and described in U.S. Pat. No. 8,079,453, published on Dec. 20, 2011, by Kimes, entitled "Controllable Overrunning Coupling Assembly." The implementation of such alternative selectable clutches in vehicles and controlling the mode switching using such clutches with actuator devices in accordance with the present disclosure would be within the capabilities of those skilled in the art and is contemplated by the inventors.

Figure 5:
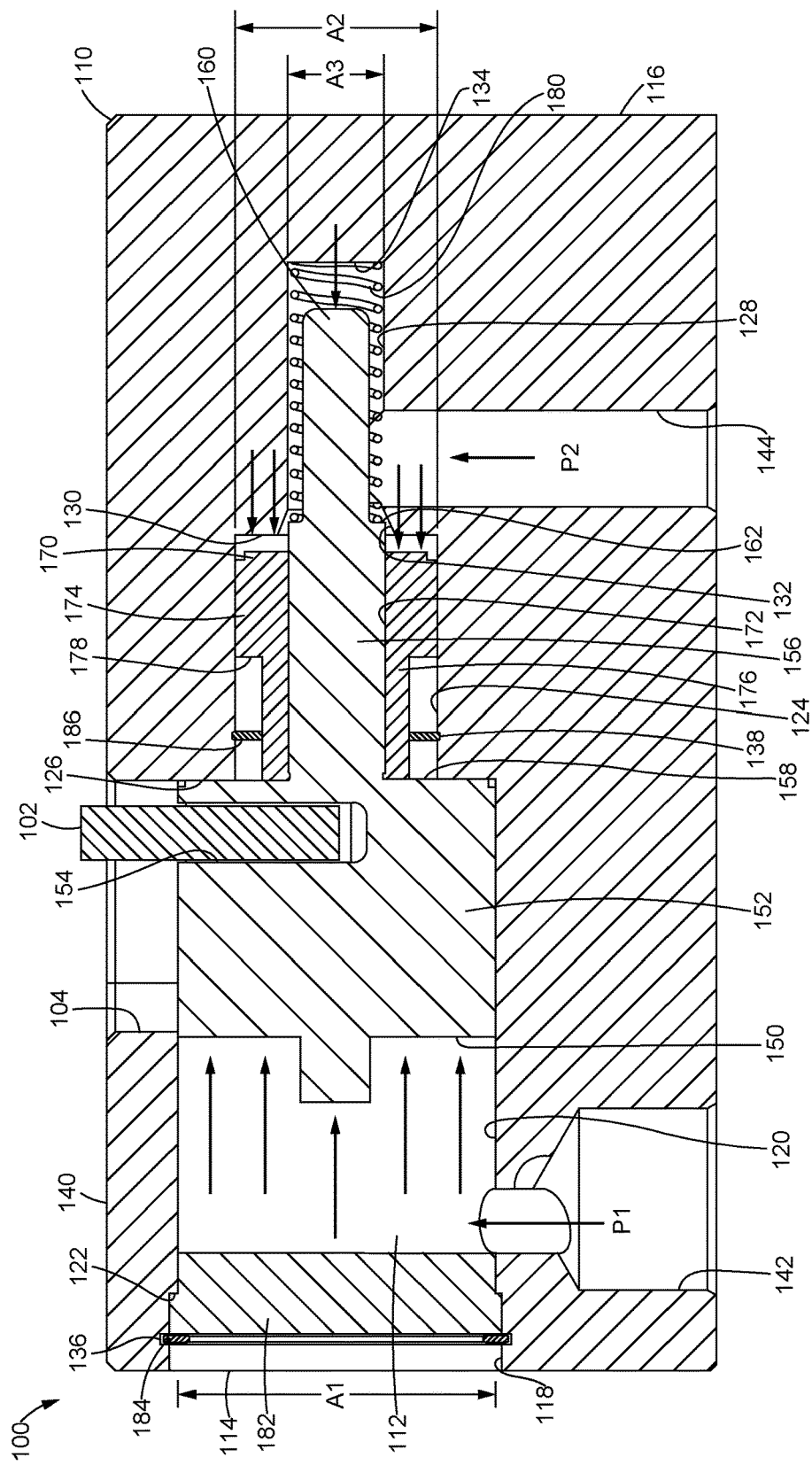
FIG. 5 is a cross-sectional view taken through line 5-5 of FIG. 2 of an embodiment of an actuator device in accordance with the present disclosure in position to place the actuator cam in the one-way locked, one-way unlocked position.

FIG. 5 illustrates one embodiment of the actuator device 100 shown in a cross-sectional view taken through line 5-5 of FIG. 2. The actuator device 100 may include a piston housing 110 having a longitudinal bore 112 extending inwardly into the piston housing 110 from an open end 114 to a closed end 116 disposed opposite the open end 114. The longitudinal bore 112 may have several transitions of an inner diameter as the longitudinal bore 112 extends inwardly to accommodate various internal components of the actuator device 100. The longitudinal bore 112 may include a cap bore portion 118 proximate the open end 114 that transitions to a main bore portion 120 having a smaller inner diameter at a first bore shoulder 122, and the main bore portion 120 may transition to a secondary bore portion 124 having a smaller inner diameter at a second bore shoulder 126. The secondary bore portion 124 may transition to a spring retention portion 128 having a smaller inner diameter at a third bore shoulder 130 and a bore countersunk surface 132, and the spring retention portion 128 may terminate at a bore end wall 134. The longitudinal bore 112 may further define a cap snap ring annular groove 136 in the cap bore portion 118 having a larger inner diameter than the cap bore portion 118, and a stop snap ring annular groove 138 in the secondary bore portion 124 having a larger inner diameter than the secondary bore portion 124. The functions of the annular grooves 136, 138 are explained further below.

Additional passages may be defined in the piston housing 110. The longitudinal slot 104 may extend inwardly from an exterior surface 140 of the piston housing 110 and intersect the longitudinal bore 112 at the main bore portion 120 proximate the second bore shoulder 126 and the secondary bore portion 124. A first fluid passage 142 may extend inwardly from the exterior surface 140 and intersect the main bore portion 120 proximate the first bore shoulder 122. A second fluid passage 144 may extend inwardly from the exterior surface 140 and intersect the spring retention portion 128. The first fluid passage 142 and the second fluid passage 144 may be configured for connection to conduits (not shown) from fluid sources (not shown) of the vehicle for provision hydraulic fluid to the main bore portion 120 and the spring retention portion 128, respectively. As discussed further below, one or both of the fluid passages 142, 144 may be connected to pressurized fluid sources providing hydraulic fluid with varying pressures to control the operation of the actuator device 100 and, correspondingly, the multimode clutch 10.

The actuator device 100 may include a main piston 150 disposed within the longitudinal bore 112 and slidable back and forth in the longitudinal direction within the longitudinal bore 112. The main piston 150 may include a main piston main portion 152 disposed within the main bore portion 120. The main piston main portion 152 may have an outer diameter that is less than the inner diameter of the main bore portion 120 so that the main piston main portion 152 may slide therein without leakage of hydraulic fluid there between. If necessary, appropriate seals (not shown) may be provided at the interface between the main bore portion 120 and the main piston main portion 152 to further prevent leakage of hydraulic fluid. The main piston main portion 152 may have an actuator bar bore 154 extending radially inwardly into the main piston main portion 152 and aligned with the longitudinal slot 104 to receive and retain an end of the cam actuator bar 102. The main piston 150 may transition from the main piston main portion 152 to a main piston secondary portion 156 having a smaller outer diameter at a first main piston shoulder 158, and then transitioning to a main piston spring portion 160 having a still smaller outer diameter at a second main piston shoulder 162.

The outer diameter of the main piston secondary portion 156 may be smaller than the inner diameter of the secondary bore portion 124 so that a secondary piston 170 may be disposed there between. The secondary piston 170 may have a secondary piston longitudinal bore 172 there through having an inner diameter that is greater than the outer diameter of the main piston secondary portion 156 so that the main piston 150 and the secondary piston 170 may slide longitudinally relative to each other without leakage of hydraulic fluid there between. If necessary, appropriate seals (not shown) may be provided at the interface between the main piston secondary portion 156 and the secondary piston longitudinal bore 172 to further prevent leakage of hydraulic fluid. The secondary piston 170 may include a secondary piston main portion 174 having an outer diameter that is less than the inner diameter of the secondary bore portion 124 so that the secondary piston main portion 174 may slide therein without leakage of hydraulic fluid there between. If necessary, appropriate seals (not shown) may be provided at the interface between the secondary bore portion 124 and the secondary piston main portion 174 to further prevent leakage of hydraulic fluid. The secondary piston 170 may transition from the secondary piston main portion 174 to a secondary piston secondary portion 176 having a smaller outer diameter at a secondary piston shoulder 178. The secondary piston secondary portion 176 may be disposed between the secondary piston main portion 174 and the main piston main portion 152 to function as described more fully below.

The outer diameter of the main piston spring portion 160 may be smaller than the inner diameter of the spring retention portion 128 so that a piston spring 180 may be disposed there between. The piston spring 180 may be compressed between the bore end wall 134 and the second main piston shoulder 162 to provide a force biasing the main piston 150 toward the open end 114 of the longitudinal bore 112. The main piston 150 may be retained within the longitudinal bore 112 by a cap 182 inserted through the open end 114 of the longitudinal bore 112 and engaged by the first bore shoulder 122. The cap 182 may be held in place by a cap snap ring 184. The cap snap ring 184 may be annular and have an outer diameter that is greater than the inner diameter of the cap bore portion 118, and may be pressed into the cap snap ring annular groove 136 to lock the cap 182 in place. The actuator device 100 may further include a stop snap ring 186 that may be annular and may have an outer diameter that is greater than the inner diameter of the secondary bore portion 124 so that the stop snap ring 186 may be pressed into the stop snap ring annular groove 138. The stop snap ring 186 may have an inner surface with an inner diameter that is greater than the outer diameter of the secondary piston secondary portion 176 so that the stop snap ring 186 may be disposed over the secondary piston secondary portion 176 without engaging the secondary piston secondary portion 176 and restricting longitudinal movement of the main piston 150 and the secondary piston 170.

In the illustrated embodiment, the position of the main piston 150, the cam actuator bar 102 and, correspondingly, the actuator cam 60 will be dictated by a first pressure P1 at the first fluid passage 142, a second pressure P1 at the second fluid passage 144, and the amount of compression of the piston spring 180. The first pressure P1 acts on the main piston main portion 152 to exert a first pressure force F1 to the right in as seen in FIG. 5, and has a magnitude equal to P1×A1, where A1 is the cross-sectional area of the main piston main portion 152. The second pressure P2 acts on the main piston secondary portion 156 and the main piston spring portion 160, as well as the secondary piston main portion 174, to exert a second pressure force F2 on the main piston 150 to the left. The second pressure force F2 has a magnitude equal to P2×A2, where A2 is the combined cross-sectional area of the main piston secondary portion 156 and the secondary piston main portion 174. Finally, the piston spring 180 exerts a spring force FS on the main piston 150 to the left having a magnitude equal to kX, where k is the spring constant for the piston spring 180 and X is the amount of compression of the piston spring 180. It is contemplated that the spring constant k will have a constant value over the operating range of the actuator device 100.

In the present example, the second pressure P2 has a value that is approximately constant and equal to a system pressure of the vehicle that is known to the control system causing changes in the position of the actuator device 100 and the mode of the multimode clutch 10. The first pressure P1 is a control pressure that may be varied by controlling an output pressure of a pressurized hydraulic fluid source (not shown) in fluid communication with the first fluid passage 142. As a result, the first pressure P1 is controlled and varied to move the main piston 150 and the cam actuator bar 102.

As seen in FIG. 5, the main piston 150 is moved to the right with the first main piston shoulder 158 engaged by the second bore shoulder 126. In this position, the cam actuator bar 102 has moved the actuator cam 60 to the first mode position shown in FIG. 2. The force equation for this position may be expressed as F1>F2+FS, or P1*A1>P2*A2+kX. Holding the first pressure P1 constant, or increasing the first pressure P1, will maintain the main piston 150 at the right limit position and keep the multimode clutch 10 in the first mode.

When a controller (not shown) of the vehicle detects that the multimode clutch 10 should move to a second mode such as that shown in FIG. 3, the controller may cause the pressurized hydraulic fluid source to reduce the first pressure P1. When the force equation changes to F1<F2+FS, or P1*A1<P2*A2+kX, the second pressure force F2 and the spring force FS may overcome the first pressure force F1 and cause the main piston 150 to begin to move to the left toward the second mode position shown in FIG. 6. At the position of FIG. 6, the secondary piston shoulder 178 has moved into engagement with the stop snap ring 186 and cannot move further to the left. As a consequence, the force applied to the secondary piston 170 is borne by the stop snap ring 186, and is no longer transferred to the main piston 150. Only the pressure force applied by the second pressure P2 to the main piston secondary portion 156 and the main piston spring portion 160 acts on the main piston 150. At this point, the magnitude of the second pressure force F2 changes to P2×A3, where A3 is the cross-sectional area of the main piston secondary portion 156. The area A3 is smaller than the area A2 and causes an instantaneous drop in the second pressure force F2 so that the force equation converts to F1>F2+FS, or P1*A1>P2*A3+kX.

Figure 6:
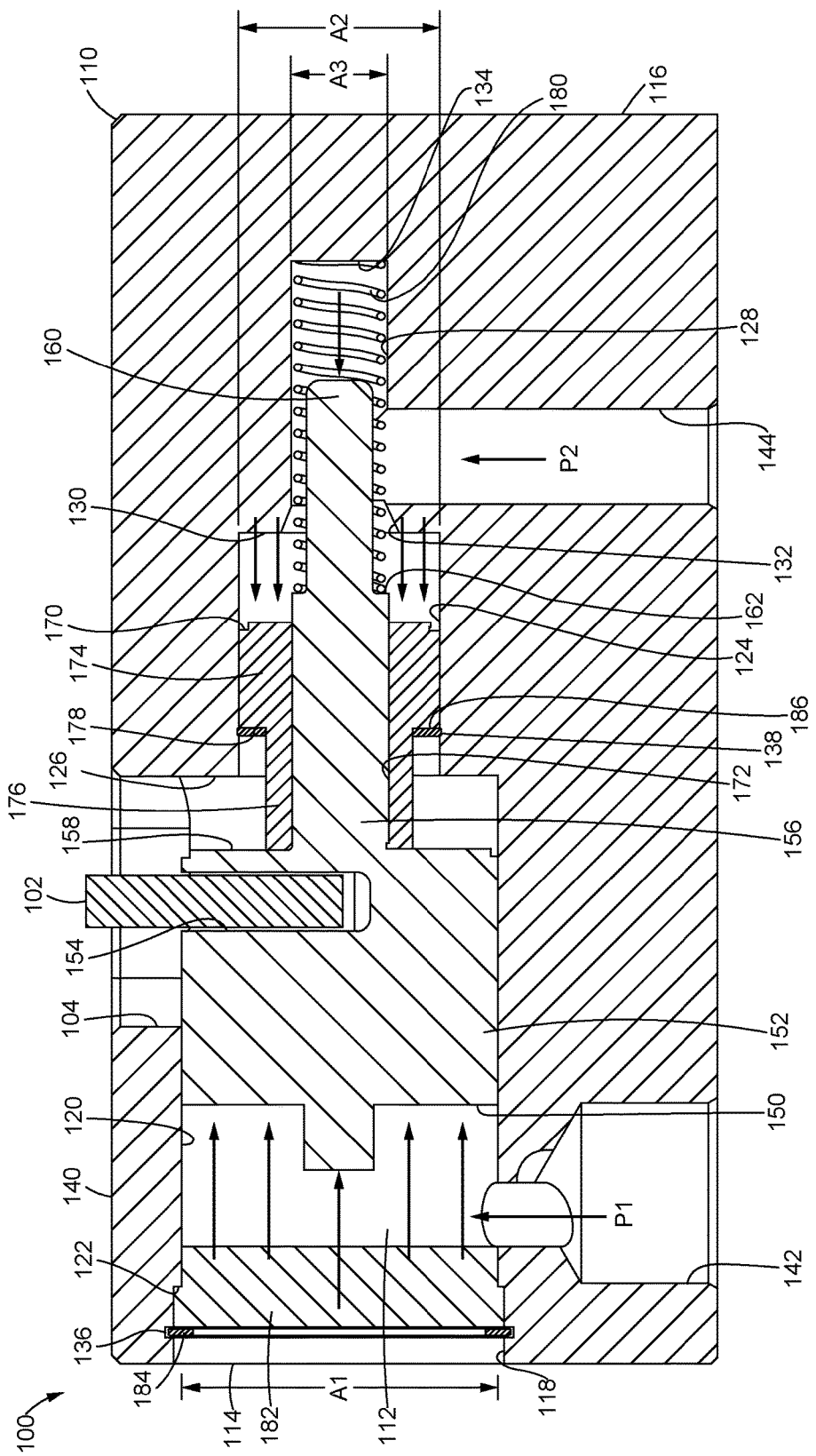
FIG. 6 is a cross-sectional view taken through line 6-6 of FIG. 3 of the embodiment of the actuator device in position to place the actuator cam in the two-way unlocked position.
Figure 7:
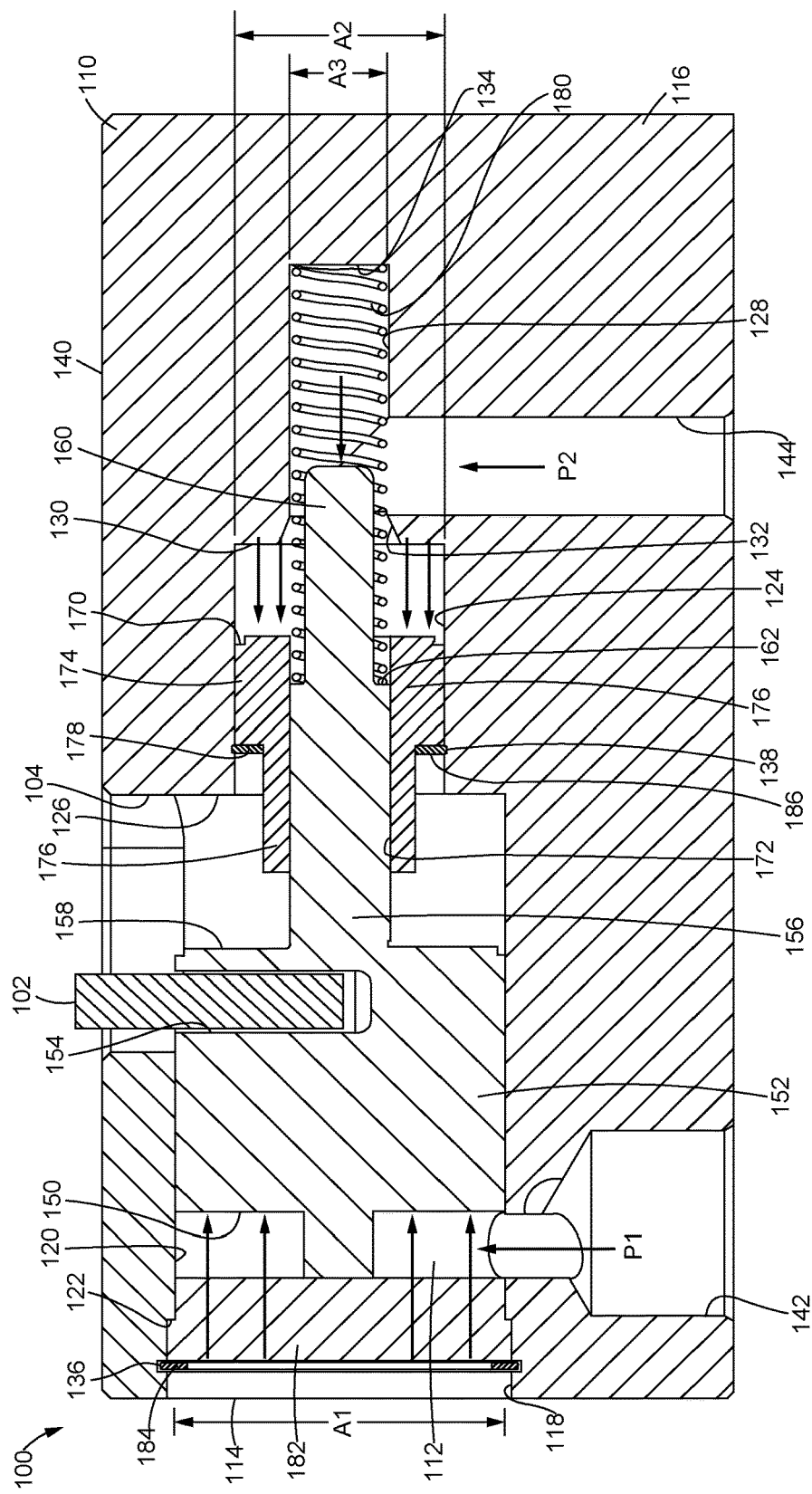
FIG. 7 is a cross-sectional view taken through line 7-7 of FIG. 4 of the embodiment of the actuator device in position to place the actuator cam in the one-way locked, one-way unlocked position.

Due to the transition to the smaller cross-sectional area A3, the main piston 150 will remain at the second mode position of FIG. 6 until the first pressure P1 decreases to a value where the force equation changes to F1<F2+FS, or P1*A1<P2*A3+kX. The magnitude of the change from the area A2 to the area A3 will dictate the necessary reduction of the first pressure P1 necessary to shift the equation and cause the main piston 150 to again move to the left toward the third mode position shown in FIG. 7 where the main piston 150 engages the cap 182 to define a hard stop at which the main piston 150 and the cam actuator bar 102 move the actuator cam 60 to the third mode position shown in FIG. 4. When the controller determines that the actuator device 100 should move the right form the third mode position to either the first or the second mode position, the controller may cause the pressurized hydraulic fluid source to increase the first pressure P1 so that the first pressure force F1 exceeds the sum of the second pressure force F2 plus the spring force FS.

INDUSTRIAL APPLICABILITY

Figure 8:
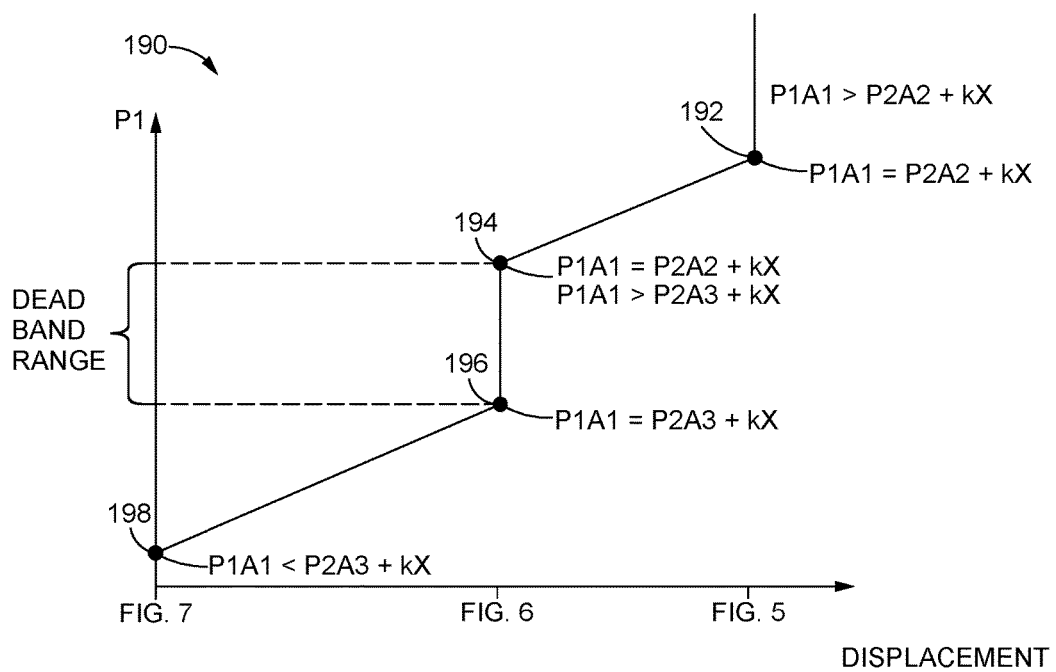
FIG. 8 is a graph of a first pressure that is controlled versus a displacement of a main piston of the actuator device of FIGS. 5-7.

The actuator device 100 in accordance with the present disclosure may eliminate the need for a position sensor to provide feedback to the selectable clutch control strategy of the position of the actuator cam 60, the cam actuator bar 102 or the main piston 150, while still allowing for precise precision control of the actuator device 100. FIG. 8 provides a graph 190 of the first pressure P1 versus the displacement of the main piston 150. A first point 192 on the graph 190 represents a first equilibrium point where the main piston 150 is disposed in the first mode position of FIG. 5. At the first point 192, the force equation is P1*A1=P2*A2+kX such that any decrease in the first pressure P1 will cause the main piston 150 to move to the left, and any increase in the first pressure P1 will increase the force of the first main piston shoulder 158 against the second bore shoulder 126, but will not result in further displacement to the right.

At a second point 194 on the graph 190 represents a second equilibrium point where the main piston 150 arrives at the second mode position of FIG. 6 from the first mode position. The force equation utilizing the area A2 is also P1*A1=P2*A2+kX such that any increase in the first pressure P1 will cause the main piston 150 to move to the right, and any decrease in the first pressure P1 will reduce the first pressure force F1 against the main piston 150, but will not yet result in further displacement to the left because the force equation utilizing the area A3 is also P1*A1>P2*A3+kX. The main piston 150 will remain in place as the first pressure P1 drops until reaching a third point 196 representing a third equilibrium point where P1*A1=P2*A3+kX. At pressures below the third point 196, the main piston 150 may again move to the left until reaching the third mode position of FIG. 7 at a fourth point 198.

This arrangement of the actuator device 100 facilitates precise control of the position of the main piston 150 without requiring precise control of the first pressure P1. As shown in the graph 190 of FIG. 8, the positive stop provided by the stop snap ring 186 and corresponding transition between the area A2 and the area A3 allow the first pressure P1 to have any value within a dead band range between the second point 194 and the third point 196 and maintain the main piston in the second mode position. The size of the dead band range may be varied as necessary by adjusting the areas A2, A3 to yield a desired responsiveness of the actuator device 100 around the second mode position and the precision required in controlling the first pressure P1 from the pressurize hydraulic fluid source.

Those skilled in the art will understand that the configuration of the actuator device 100 and the control strategy described herein are exemplary, and modifications of the design are contemplated. For example, in alternative embodiments, the first pressure P1 may be held constant and the second pressure P2 may be controlled to move the main piston 150 to the right (decrease the second pressure P2) and to the left (increase the second pressure P2. In further alternatives, both pressures P1, P2 may be controlled so that a pressure differential is varied to move the main piston 150. Also, while three clutch modes are illustrated and described herein, those skilled in the art will understand that the actuator device 100 may be configured with additional positive stops at which a transition between sizes of areas acted upon by pressures occur to create additional dead band ranges where the main piston 150 stops at a mode position for the multimode clutch 10. Such variations are contemplated by the inventors as having use in actuator devices in accordance with the present disclosure.

The design may also be varied in terms of the location and presence of the piston spring 180. The piston spring 180 may be moved to other locations in and around the actuator device 100 while still having an effect on the graph 190 and the response and control of the main piston 150. For example, the piston spring 180 could be moved to the opposite side of the main piston 150 and positioned between the main piston 150 and the cap 182. In this position, the piston spring 180 would bias the main piston 150 toward the one-way locked, one-way unlocked position of FIG. 5. In these embodiments, the spring force FS would be subtracted from the second pressure force F2 in the equations discussed above. With the spring force FS assisting the first pressure force F1 in moving the main piston 150 to the right, the curve of the graph 190 will move downward and lower first pressures P1 will need to be generated to move the main piston 150 between the locking positions. It is also contemplated that piston springs 150 may be installed on both sides of the main piston 150 so that the main piston 150 is biased to an intermediate locking positions such as that shown in FIG. 6. In such embodiments, factors representing the spring force FS will appear on both sides of the force balancing equations, and the first pressure F1 will be adjusted accordingly in the control strategy for the actuator device 100.

In other embodiments, the piston spring 180 may be located external to the piston housing 110, and still be operatively connected to the cam actuator bar 102 to provide the spring force FS to the main piston 150. For example, the piston spring 180 may be coupled between a stationary portion of the vehicle, such as the vehicle frame, and the cam actuator bar 102. Alternatively, the piston spring 180 may be connected between the stationary structure and the cam actuator 60 that will transfer the spring force FS of the piston spring 180 to the main piston 150 through the intervening connection provided by the cam actuator bar 102. Such external arrangements of the piston spring 180 can function to apply the spring force FS in either direction to either work against or assist the first pressure force F1 in moving the main piston 150 between the locking positions, or in both directions to bias the main piston 150 toward an intermediate locking position.

In further alternative embodiments, the piston spring 180 may be omitted so that no spring force FS acts on the main piston 150. In such embodiments, the controlled first pressure P1 will be adjusted accordingly to reflect the absence of the spring force FS from the force balancing equations discussed above. With the spring force FS omitted, the curve of the graph 190 will move downward by an amount that is less than in the situation above where the spring force FS is shifted to assisting the first pressure force F1, but removal of the piston spring 180 will still lower first pressures P1 required to move the main piston 150 between the locking positions.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. An actuator device for a selectable clutch having a plurality of mode positions for controlling relative rotation between two components connected by the selectable clutch, the actuator device comprising:
 a piston housing having an exterior surface, a piston housing longitudinal bore extending longitudinally there through, a first fluid passage extending inwardly from the exterior surface and intersecting the piston housing longitudinal bore proximate a first bore end, and a second fluid passage extending inwardly from the exterior surface and intersecting the piston housing longitudinal bore proximate a second bore end;
 a main piston disposed within the piston housing longitudinal bore for longitudinal motion therein, the main piston comprising:
  a main piston main portion having a main piston main portion outer diameter and being disposed between the first fluid passage and the second fluid passage, and a main piston secondary portion having a main piston secondary portion outer diameter that is less than the main piston main portion outer diameter and extending longitudinally from the main piston main portion toward the second fluid passage;

a secondary piston having a secondary piston longitudinal bore such that the secondary piston is disposed and slidable on the main piston secondary portion, the secondary piston comprising:

a secondary piston main portion having a secondary piston main portion outer diameter that is less than the main piston main portion outer diameter, and a secondary piston secondary portion having a secondary piston secondary portion outer diameter that is less than the secondary piston main portion outer diameter and being disposed between the main piston main portion and the secondary piston main portion; and a stop snap ring having an annular shape and a stop snap ring inner diameter that is less than the secondary piston main portion outer diameter and greater than the secondary piston secondary portion outer diameter, wherein the stop snap ring is fixed within the piston housing longitudinal bore between the main piston main portion and the secondary piston main portion and with the secondary piston secondary portion extending there through, wherein a first pressure force acting on the main piston toward the second bore end is equal to a first pressure supplied at the first fluid passage multiplied by a first area equal to a main piston cross-sectional area of the main piston main portion, wherein a second pressure force acting on the main piston toward the first bore end when the secondary piston main portion is not engaged by the stop snap ring is equal to a second pressure supplied at the second fluid passage multiplied by a second area equal to a combined cross-sectional area of a main piston secondary portion cross-sectional area and a secondary piston main portion cross-sectional area; and wherein a third pressure force acting on the main piston toward the first bore end when the secondary piston main portion is engaged by the stop snap ring is equal to the second pressure supplied at the second fluid passage multiplied by a third area equal to the main piston secondary portion cross-sectional area.

2. The actuator device according to claim 1, comprising a piston spring operatively connected to the main piston, wherein a spring force acting on the main piston toward one of the first bore end and the second bore end is equal to a spring constant for the piston spring multiplied by an amount of compression of the piston spring.

3. The actuator device according to claim 2, wherein the spring force biases the main piston toward the first bore end.

4. The actuator device according to claim 3, wherein the first pressure force acts on the main piston and the secondary piston main portion does not engage the stop snap ring when the first pressure force is greater than the second pressure force plus the spring force.

5. The actuator device according to claim 3, wherein the third pressure force acts on the main piston and the secondary piston main portion engages the stop snap ring when the first pressure force is less than the second pressure force plus the spring force, and wherein the main piston is engaged with the secondary piston when the first pressure force is less than the second pressure force plus the spring force and is greater than the third pressure force plus the spring force.

6. The actuator device according to claim 3, wherein the third pressure force acts on the main piston, the secondary piston main portion engages the stop snap ring and the main piston disengages from the secondary piston and moves toward the first bore end when the first pressure force is less than the third pressure force plus the spring force.

7. The actuator device according to claim 3, wherein the piston spring is dispose within the piston housing longitudinal bore between the main piston and a bore end wall at the second bore end.

8. The actuator device according to claim 2, wherein the piston spring is disposed external to the piston housing and operatively connected to the main piston.

9. The actuator device to claim 1, wherein the piston housing longitudinal bore has a main bore portion having a main bore portion inner diameter, a secondary bore portion having a secondary bore portion inner diameter that is less than the main bore portion inner diameter, and wherein the main piston main portion is disposed within the main bore portion and the main piston secondary portion and the secondary piston are disposed within the secondary bore portion.

10. The actuator device according to claim 9, wherein a transition between the main bore portion and the secondary bore portion defines a bore shoulder that engages the main piston main portion to limit movement of the main piston toward the second bore end.

11. The actuator device according to claim 1, wherein the piston housing includes a longitudinal slot extending inwardly from the exterior surface and intersecting the piston housing longitudinal bore, and wherein the actuator device comprises a cam actuator bar mounted to the main piston main portion and extending through the longitudinal slot so that the cam actuator bar can be operatively connected to an actuator cam of the selectable clutch to move the selectable clutch between the plurality of mode positions as the main piston moves longitudinally within the piston housing longitudinal bore.

12. A selectable clutch comprising:
an outer race;
an inner race rotatable relative to the outer race;
a selective locking mechanism having a plurality of locking modes for controlling relative rotation between the two components connected by the selectable clutch;
an actuator cam that is rotatable between a plurality of mode positions each causing the selective locking mechanism to engage one of the plurality of locking modes; and
the actuator device according to claim 1 operatively connected to the actuator cam to move the selective locking mechanism between the plurality of mode positions as the main piston moves longitudinally within the piston housing longitudinal bore.

13. The selectable clutch according to claim 12, wherein the piston housing comprises a longitudinal slot extending inwardly from the exterior surface and intersection the piston housing longitudinal bore, and wherein the actuator device comprises a cam actuator bar mounted to the main piston, extending through the longitudinal slot and operatively connected to the actuator cam to move the actuator cam between the plurality of mode positions.

14. The selectable clutch according to claim 13, wherein the actuator cam comprises an actuator tab operatively connected to the cam actuator bar.

15. The selectable clutch according to claim 14, wherein the actuator tab has a radially extending slot receiving the cam actuator bar.

16. An actuator device for a selectable clutch having a plurality of mode positions for controlling relative rotation between two components connected by the selectable clutch, the actuator device comprising:
- a piston housing having an exterior surface, a piston housing longitudinal bore extending longitudinally there through, a first fluid passage extending inwardly from the exterior surface and intersecting the piston housing longitudinal bore proximate a first bore end, and a second fluid passage extending inwardly from the exterior surface and intersecting the piston housing longitudinal bore proximate a second bore end;
- a main piston disposed within the piston housing longitudinal bore for longitudinal motion therein, the main piston comprising:
  - a main piston main portion having a main piston main portion outer diameter and being disposed between the first fluid passage and the second fluid passage, and
  - a main piston secondary portion having a main piston secondary portion outer diameter that is less than the main piston main portion outer diameter and extending longitudinally from the main piston main portion toward the second fluid passage;
- a secondary piston having a secondary piston outer diameter and a secondary piston longitudinal bore such that the secondary piston is disposed and slidable on the main piston secondary portion within the piston housing longitudinal bore; and
- a stop snap ring fixed within the piston housing longitudinal bore between the main piston main portion and the second bore end and having an annular shape and a stop snap ring inner diameter that allow at least a portion of the secondary piston to pass through the stop snap ring,
- wherein a first pressure force acting on the main piston toward the second bore end is equal to a first pressure supplied at the first fluid passage multiplied by a first area equal to a main piston cross-sectional area of the main piston main portion,
- wherein a second pressure force acting on the main piston toward the first bore end when the secondary piston is not engaged by the stop snap ring is equal to a second pressure supplied at the second fluid passage multiplied by a second area equal to a combined cross-sectional area of a main piston secondary portion cross-sectional area and a secondary piston main portion cross-sectional area, and
- wherein the second pressure force acting on the main piston when the secondary piston is engaged by the stop snap ring is equal to the second pressure supplied at the second fluid passage multiplied by a third area equal to the main piston secondary portion cross-sectional area.

17. The actuator device according to claim 16, comprising a piston spring operatively connected to the main piston, wherein a spring force acting on the main piston toward one of the first bore end and the second bore end is equal to a spring constant for the piston spring multiplied by an amount of compression of the piston spring.

18. The actuator device according to claim 17, wherein the spring force biases the main piston toward the first bore end.

19. The actuator device according to claim 18, wherein the second pressure force is equal to the second pressure multiplied by the second area when the first pressure force is greater than the spring force plus a product of the second pressure multiplied by the second area, and the second pressure force is equal to the second pressure multiplied by the third area when the first pressure force is less than the spring force plus the product of the second pressure multiplied by the second area.

20. The actuator device according to claim 18, wherein the main piston disengages from the secondary piston and moves toward the first bore end when the first pressure force is less than the spring force plus a product of the second pressure multiplied by the third area.

* * * * *